United States Patent
Tsai et al.

(10) Patent No.: US 10,101,563 B1
(45) Date of Patent: Oct. 16, 2018

(54) FIVE-PIECE OPTICAL LENS SYSTEM

(71) Applicant: NEWMAX TECHNOLOGY CO., LTD., Tai-Chung (TW)

(72) Inventors: Fei-Hsin Tsai, Tai-Chung (TW); Sian-Chih Ke, Tai-Chung (TW)

(73) Assignee: NEXMAX TECHNOLOGY CO., LTD. (TW)

( * ) Notice: Subject to any disclaimer, the term of this patent is extended or adjusted under 35 U.S.C. 154(b) by 0 days.

(21) Appl. No.: 15/641,320

(22) Filed: Jul. 5, 2017

(51) Int. Cl.
  *G02B 13/18* (2006.01)
  *G02B 3/02* (2006.01)
  *G02B 9/60* (2006.01)
  *G02B 13/00* (2006.01)

(52) U.S. Cl.
  CPC ........... *G02B 13/0045* (2013.01); *G02B 9/60* (2013.01)

(58) Field of Classification Search
  CPC ....... G02B 13/0045; G02B 9/60; G02B 13/04
  USPC ................. 359/714, 753, 763, 764
  See application file for complete search history.

(56) References Cited

U.S. PATENT DOCUMENTS 9,835,826 B2 * 12/2017 Liu .......... G02B 9/60

* cited by examiner

*Primary Examiner* — William Choi
(74) *Attorney, Agent, or Firm* — Bruce Stone LLP; Joseph Bruce

(57) ABSTRACT

A five-piece optical lens system includes, in order from the object side to the image side: a stop, a first lens element with a positive refractive power, a second lens element with a negative refractive power, a third lens element with a negative refractive power, a fourth lens element with a negative refractive power, a fifth lens element with a positive refractive power. Such arrangements not only can be applied to a portable electronic product, but also has a long focal length, high pixel and low height.

20 Claims, 10 Drawing Sheets

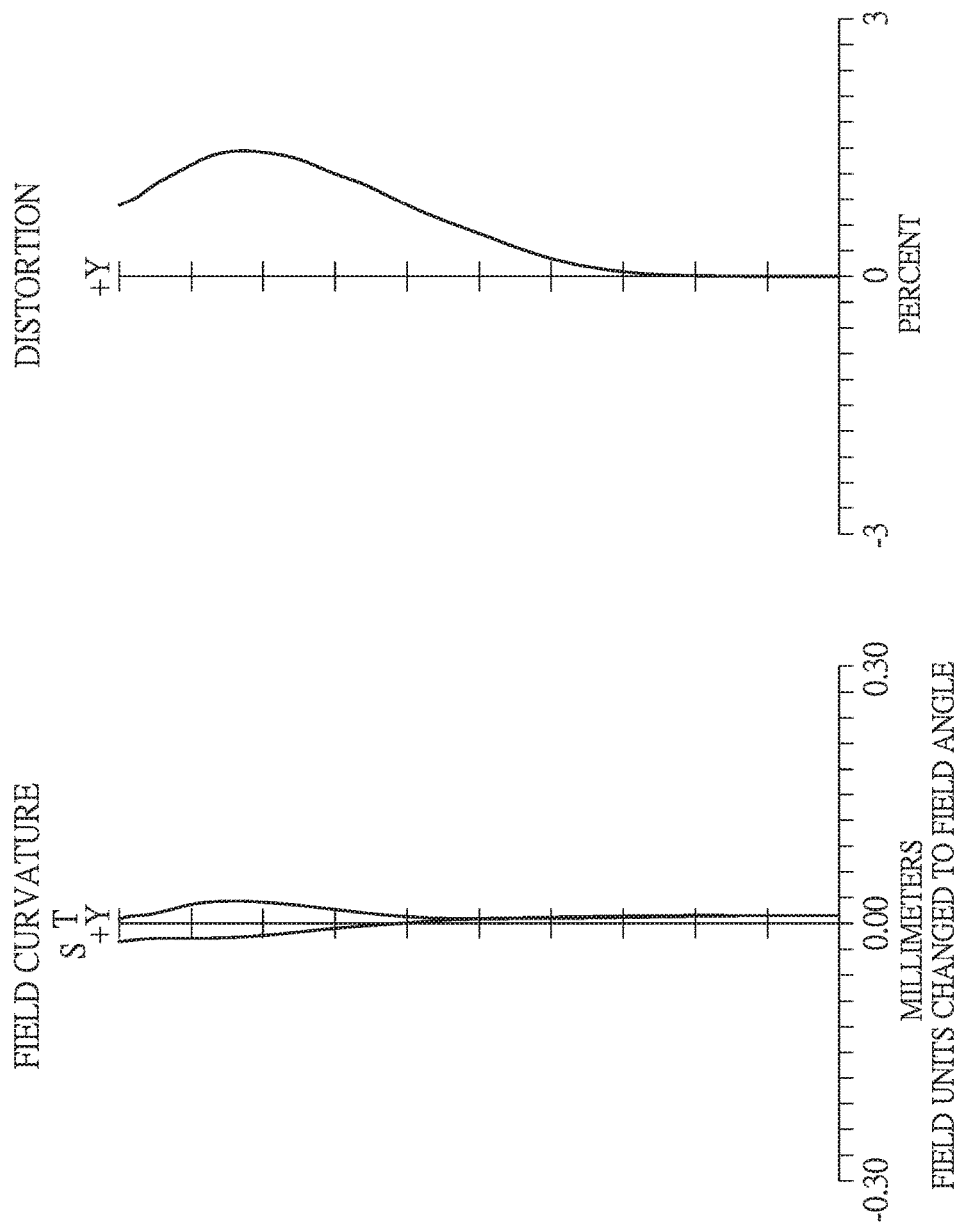

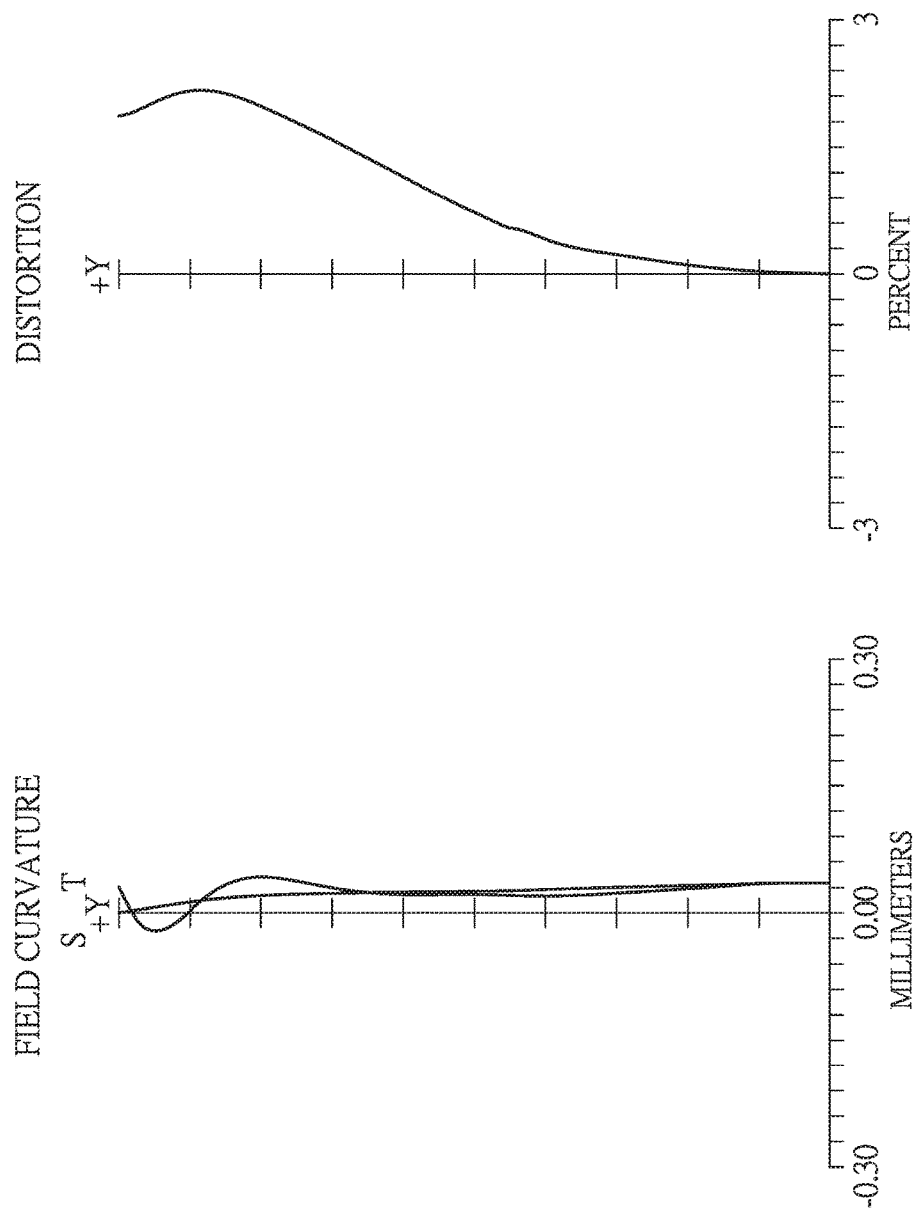

FIVE-PIECE OPTICAL LENS SYSTEM

BACKGROUND

Field of the Invention

The present invention relates to a five-piece optical lens system, and more particularly to a miniaturized five-piece optical lens system applicable to electronic products.

Description of the Prior Art

Miniaturized optical lens systems with high resolution have been the standard equipment for various mobile devices, and as the advanced semiconductor manufacturing technologies have allowed the pixel size of electronic sensors to be reduced and compact, there's an increasing demand for imaging lens featuring finer resolution and better image quality.

Conventional miniaturized lens systems used in portable electronic products mostly consist of four lens elements, however, miniaturization, high performance and high resolution have become the trend of modern electronic products, such as, mobile phone. As the pixel size of electronic imaging sensors gradually becomes smaller and smaller, and the system requires higher image quality. The conventional optical lens system comprising four lens elements cannot satisfy the requirements of higher resolution optical lens systems.

The present invention mitigates and/or obviates the aforementioned disadvantages.

SUMMARY OF THE INVENTION

The primary objective of the present invention is to provide a five-piece optical lens system without having an excessively long total track length, the five-piece optical lens system not only can be applied to a portable electronic product, but also has a long focal length, high pixel and low height.

Therefore, a five-piece optical lens system in accordance with the present invention comprises, in order from an object side to an image side: a stop; a first lens element with a positive refractive power having an object-side surface being convex near an optical axis, at least one of the object-side surface and an image-side surface of the first lens element being aspheric; a second lens element with a negative refractive power having an object-side surface being convex near the optical axis and an image-side surface being concave near the optical axis, at least one of the object-side surface and the image-side surface of the second lens element being aspheric; a third lens element with a negative refractive power having an object-side surface being convex near the optical axis and an image-side surface being concave near the optical axis, at least one of the object-side surface and the image-side surface of the third lens element being aspheric; a fourth lens element with a negative refractive power having an object-side surface being concave near the optical axis and an image-side surface being concave near the optical axis, at least one of the object-side surface and the image-side surface of the fourth lens element being aspheric; a fifth lens element with a positive refractive power having an image-side surface being convex near the optical axis, at least one of an object-side surface and the image-side surface of the fifth lens element being aspheric and provided with at least one inflection point.

Preferably, a focal length of the first lens element is f1, a focal length of the second lens element is f2, and they satisfy the relation: $-0.8 < f1/f2 < -0.5$, so that the refractive power of the first lens element and the second lens element are more suitable, it will be favorable to avoid the excessive increase of aberration of the system.

Preferably, the focal length of the second lens element is f2, a focal length of the third lens element is f3, and they satisfy the relation: $0.005 < f2/f3 < 0.35$, so that the refractive power of the second lens element and the third lens element are more balanced, it will be favorable to correct the aberration of the system and reduce the sensitivity of the system.

Preferably, the focal length of the third lens element is f3, a focal length of the fourth lens element is f4, and they satisfy the relation: $2.5 < f3/f4 < 43$, which can effectively reduce the total length of the optical lens system.

Preferably, the focal length of the fourth lens element is f4, a focal length of the fifth lens element is f5, and they satisfy the relation: $-0.7 < f4/f5 < -0.2$, so that the refractive power of the rear group lens system is more balanced, it will be favorable to reduce the sensitivity of the system and correct the high order aberrations of the system.

Preferably, the focal length of the first lens element is f1, the focal length of the third lens element is f3, and they satisfy the relation: $-0.25 < f1/f3 < -0.005$, so that the refractive power of the first lens element can be distributed effectively, so as to reduce the sensitivity of the five-piece optical lens system.

Preferably, the focal length of the second lens element is f2, the focal length of the fourth lens element is f4, and they satisfy the relation: $0.5 < f2/f4 < 1.0$, so that the distribution of the negative refractive power will be appropriate, it will be favorable to correct the aberration of the system and improve the image quality.

Preferably, the focal length of the third lens element is f3, the focal length of the fifth lens element is f5, and they satisfy the relation: $-23 < f3/f5 < -1.4$, it will be favorable to reduce the total length and facilitates the miniaturization of the five-piece optical lens system.

Preferably, the focal length of the first lens element is f1, a focal length of the second lens element and the third lens element combined is f23, and they satisfy the relation: $-0.95 < f1/f23 < -0.55$. If f1/f23 satisfies the above relation, the resolution can be improved evidently.

Preferably, the focal length of the second lens element and the third lens element combined is f23, a focal length of the fourth lens element and the fifth lens element combined is f45, and they satisfy the relation: $0.15 < f23/f45 < 0.65$. If f23/f45 satisfies the above relation, a high pixel and low height can be provided and the resolution can be improved evidently. Contrarily, if f23/f45 exceeds the above range, the performance and resolution of the five-piece optical lens system will be reduced, and the yield rate will be low.

Preferably, a focal length of the first lens element and the second lens element combined is f12, a focal length of the third lens element and the fourth lens element combined is f34, and they satisfy the relation: $-1.5 < f12/f34 < -0.7$, which can effectively correct image distortion.

Preferably, the focal length of the third lens element and the fourth lens element combined is f34, the focal length of the fifth lens element is f5, and they satisfy the relation: $-0.65 < f34/f5 < -0.15$. If f34/f5 satisfies the above relation, a high pixel and low height can be provided and the resolution can be improved evidently. Contrarily, if f34/f5 exceeds the above range, the performance and resolution of the five-piece optical lens system will be reduced, and the yield rate will be low.

Preferably, the focal length of the first lens element is f1, a focal length of the second lens element, the third lens element and the fourth lens element combined is f234, and they satisfy the relation: −1.8<f1/f234<−1.3. Appropriate refractive power is favorable to reduce the spherical aberration and astigmatism of the optical lens system effectively.

Preferably, the focal length of the second lens element, the third lens element and the fourth lens element combined is f234, the focal length of the fifth lens element is f5, and they satisfy the relation: −0.3<f234/f5<−0.05. Appropriate refractive power is favorable to reduce the spherical aberration and astigmatism of the optical lens system effectively.

Preferably, a focal length of the first lens element, the second lens element and the third lens element combined is f123, the focal length of the fourth lens element is f4, and they satisfy the relation: −1.2<f123/f4<−0.75. Appropriate refractive power is favorable to reduce the spherical aberration and astigmatism of the optical lens system effectively.

Preferably, the focal length of the first lens element, the second lens element and the third lens element combined is f123, the focal length of the fourth lens element and the fifth lens element combined is f45, and they satisfy the relation: −0.8<f123/f45<−0.25. Appropriate refractive power is favorable to reduce the spherical aberration and astigmatism of the optical lens system effectively.

Preferably, an Abbe number of the second lens element is V2, an Abbe number of the third lens element is V3, and they satisfy the relation: 30<V3−V2<42, which can reduce the chromatic aberration of the five-piece optical lens system effectively.

Preferably, an Abbe number of the fourth lens element is V4, an Abbe number of the fifth lens element is V5, and they satisfy the relation: 30<V4−V5<42, which can reduce the chromatic aberration of the five-piece optical lens system effectively.

Preferably, a focal length of the five-piece optical lens system is f, a distance from the object-side surface of the first lens element to the image plane along the optical axis is TL, and they satisfy the relation: 0.95<f/TL<1.3, it will be favorable to maintain the objective of miniaturization of the five-piece optical lens system, which can be used in thin electronic products.

Preferably, the focal length of the first lens element is f1, a focal length of the second lens element, the third lens element, the fourth lens element and the fifth lens element combined is f2345, and they satisfy the relation: −1.5<f1/f2345<−0.75. If f1/f2345 satisfies the above relation, the resolution can be improved evidently. Contrarily, if f1/f2345 exceeds the above range, the performance and resolution of the five-piece optical lens system will be reduced, and the yield rate will be low.

The present invention will be presented in further details from the following descriptions with the accompanying drawings, which show, for purpose of illustrations only, the preferred embodiments in accordance with the present invention.

BRIEF DESCRIPTION OF THE DRAWINGS

FIG. 2B shows the image plane curve and the distortion curve of the second embodiment of the present invention;

FIG. 4B shows the image plane curve and the distortion curve of the fourth embodiment of the present invention;

DETAILED DESCRIPTION OF THE PREFERRED EMBODIMENTS

Figure 1A:
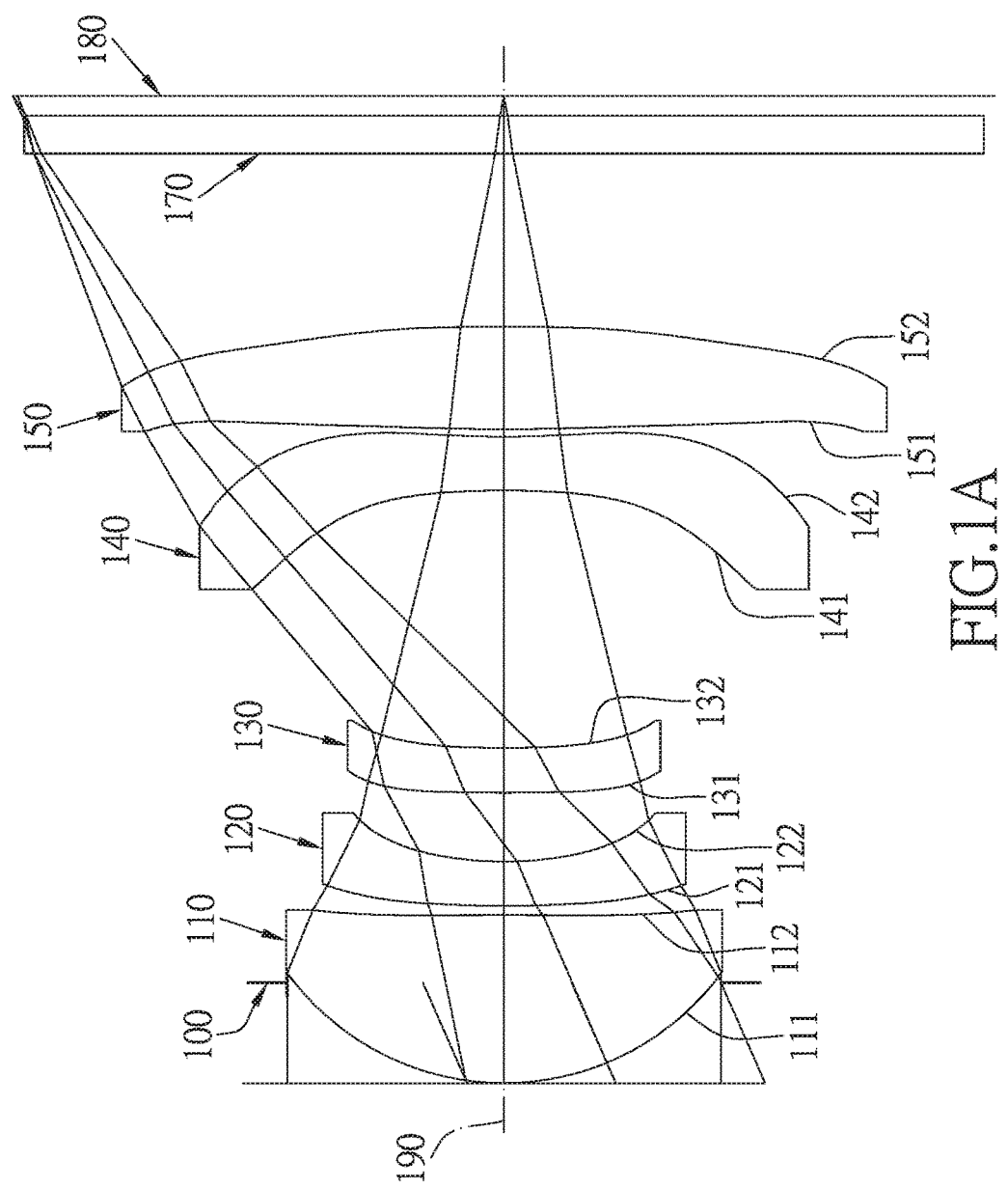
FIG. 1A shows a five-piece optical lens system in accordance with a first embodiment of the present invention.
Figure 1B:
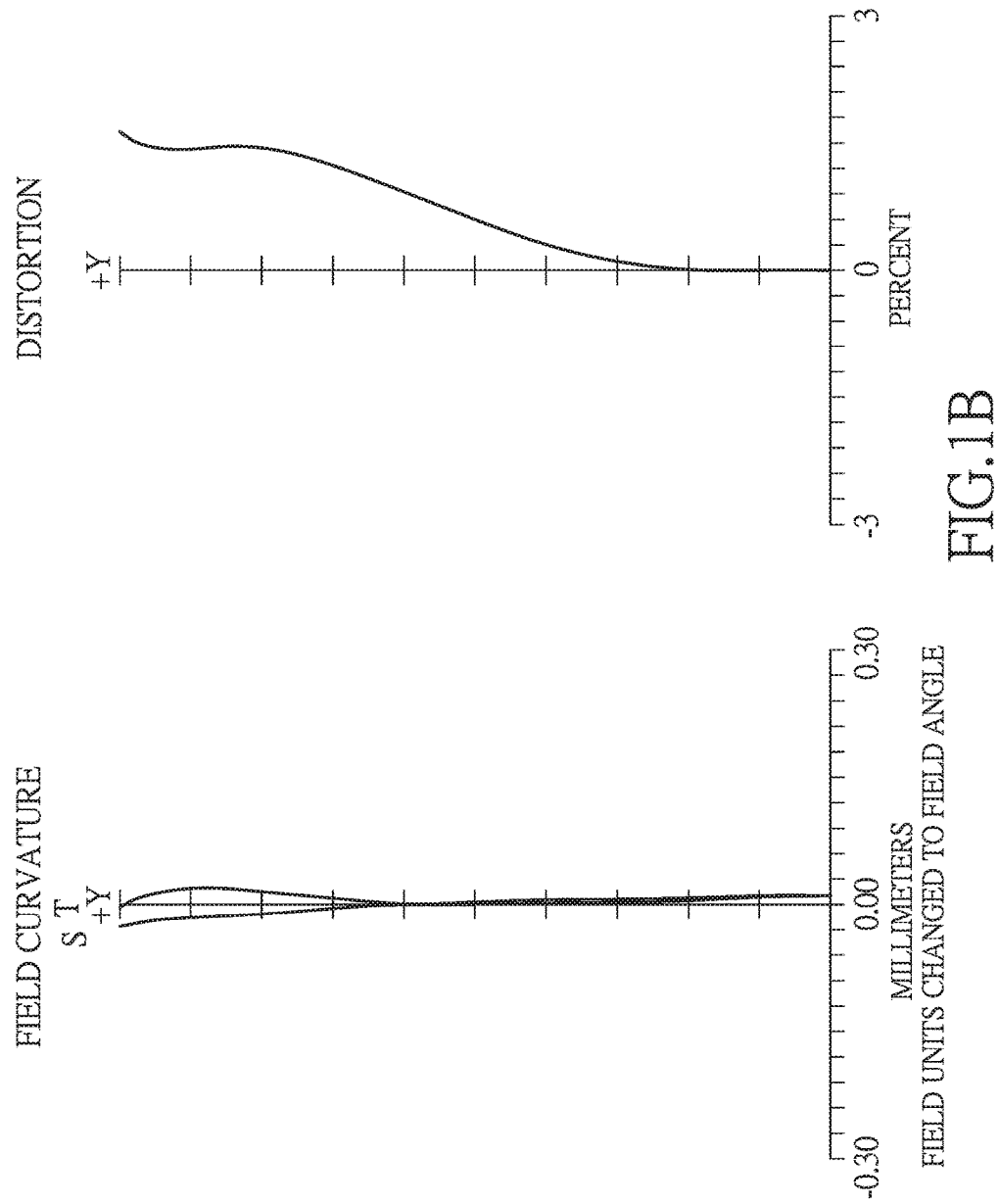
FIG. 1B shows the image plane curve and the distortion curve of the first embodiment of the present invention.

Referring to FIGS. 1A and 1B, FIG. 1A shows a five-piece optical lens system in accordance with a first embodiment of the present invention, and FIG. 1B shows, in order from left to right, the image plane curve and the distortion curve of the first embodiment of the present invention. A five-piece optical lens system in accordance with the first embodiment of the present invention comprises a stop 100 and a lens group. The lens group comprises, in order from an object side to an image side: a first lens element 110, a second lens element 120, a third lens element 130, a fourth lens element 140, a fifth lens element 150, an IR cut filter 170, and an image plane 180, wherein the five-piece optical lens system has a total of five lens elements with refractive power. The stop 100 is disposed between an object-side surface 111 and an image-side surface 112 of the first lens element 110.

The first lens element 110 with a positive refractive power has the object-side surface 111 being convex near an optical axis 190 and the image-side surface 112 being convex near the optical axis 190, the object-side surface 111 and the image-side surface 112 are aspheric, and the first lens element 110 is made of plastic material.

The second lens element 120 with a negative refractive power has an object-side surface 121 being convex near the optical axis 190 and an image-side surface 122 being concave near the optical axis 190, the object-side surface 121 and the image-side surface 122 are aspheric, and the second lens element 120 is made of plastic material.

The third lens element 130 with a negative refractive power has an object-side surface 131 being convex near the optical axis 190 and an image-side surface 132 being concave near the optical axis 190, the object-side surface 131 and the image-side surface 132 are aspheric, and the third lens element 130 is made of plastic material.

The fourth lens element 140 with a negative refractive power has an object-side surface 141 being concave near the optical axis 190 and an image-side surface 142 being concave near the optical axis 190, the object-side surface 141 and the image-side surface 142 are aspheric, and the fourth lens element 140 is made of plastic material.

The fifth lens element 150 with a positive refractive power has an object-side surface 151 being convex near the optical axis 190 and an image-side surface 152 being convex near the optical axis 190, the object-side surface 151 and the image-side surface 152 are aspheric, the fifth lens element 150 is made of plastic material, and at least one of the object-side surface 151 and the image-side surface 152 is provided with at least one inflection point.

The IR cut filter 170 made of glass is located between the fifth lens element 150 and the image plane 180 and has no influence on the focal length of the five-piece optical lens system.

The equation for the aspheric surface profiles of the respective lens elements of the first embodiment is expressed as follows:

$$z = \frac{ch^2}{1+[1-(k+1)c^2h^2]^{0.5}} + Ah^4 + Bh^6 + Ch^8 + Dh^{10} + Eh^{12} + Gh^{14} + \ldots$$

wherein:

z represents the value of a reference position with respect to a vertex of the surface of a lens and a position with a height h along the optical axis 190;

c represents a paraxial curvature equal to 1/R (R: a paraxial radius of curvature);

h represents a vertical distance from the point on the curve of the aspheric surface to the optical axis 190;

k represents the conic constant;

A, B, C, D, E, G, . . . : represent the high-order aspheric coefficients.

In the first embodiment of the present five-piece optical lens system, a focal length of the five-piece optical lens system is f, a f-number of the five-piece optical lens system is Fno, the five-piece optical lens system has a maximum view angle (field of view) FOV, and they satisfy the relations: f=6.180 mm; Fno=2.4; and FOV=47.4 degrees.

In the first embodiment of the present five-piece optical lens system, a focal length of the first lens element 110 is f1, a focal length of the second lens element 120 is f2, and they satisfy the relation: f1/f2=−0.606.

In the first embodiment of the present five-piece optical lens system, the focal length of the second lens element 120 is f2, a focal length of the third lens element 130 is f3, and they satisfy the relation: f2/f3=0.278.

In the first embodiment of the present five-piece optical lens system, the focal length of the third lens element 130 is f3, a focal length of the fourth lens element 140 is f4, and they satisfy the relation: f3/f4=3.115.

In the first embodiment of the present five-piece optical lens system, the focal length of the fourth lens element 140 is f4, a focal length of the fifth lens element 150 is f5, and they satisfy the relation: f4/f5=−0.552.

In the first embodiment of the present five-piece optical lens system, the focal length of the first lens element 110 is f1, the focal length of the third lens element 130 is f3, and they satisfy the relation: f1/f3=−0.168.

In the first embodiment of the present five-piece optical lens system, the focal length of the second lens element 120 is f2, the focal length of the fourth lens element 140 is f4, and they satisfy the relation: f2/f4=0.866.

In the first embodiment of the present five-piece optical lens system, the focal length of the third lens element 130 is f3, the focal length of the fifth lens element 150 is f5, and they satisfy the relation: f3/f5=−1.718.

In the first embodiment of the present five-piece optical lens system, the focal length of the first lens element 110 is f1, a focal length of the second lens element 120 and the third lens element 130 combined is f23, and they satisfy the relation: f1/f23=−0.796.

In the first embodiment of the present five-piece optical lens system, the focal length of the second lens element 120 and the third lens element 130 combined is f23, a focal length of the fourth lens element 140 and the fifth lens element 150 combined is f45, and they satisfy the relation: f23/f45=0.277.

In the first embodiment of the present five-piece optical lens system, a focal length of the first lens element 110 and the second lens element 120 combined is f12, a focal length of the third lens element 130 and the fourth lens element 140 combined is f34, and they satisfy the relation: f12/f34=−1.255.

In the first embodiment of the present five-piece optical lens system, the focal length of the third lens element 130 and the fourth lens element 140 combined is f34, the focal length of the fifth lens element 150 is f5, and they satisfy the relation: f34/f5=−0.390.

In the first embodiment of the present five-piece optical lens system, the focal length of the first lens element 110 is f1, a focal length of the second lens element 120, the third lens element 130 and the fourth lens element 140 combined is f234, and they satisfy the relation: f1/f234=−1.623.

In the first embodiment of the present five-piece optical lens system, the focal length of the second lens element 120, the third lens element 130 and the fourth lens element 140 combined is f234, the focal length of the fifth lens element 150 is f5, and they satisfy the relation: f234/f5=−0.178.

In the first embodiment of the present five-piece optical lens system, a focal length of the first lens element 110, the second lens element 120 and the third lens element 130 combined is f123, the focal length of the fourth lens element 140 is f4, and they satisfy the relation: f123/f4=−1.051.

In the first embodiment of the present five-piece optical lens system, the focal length of the first lens element 110, the second lens element 120 and the third lens element 130 combined is f123, the focal length of the fourth lens element 140 and the fifth lens element 150 combined is f45, and they satisfy the relation: f123/f45=−0.442.

In the first embodiment of the present five-piece optical lens system, the focal length of the first lens element 110 is f1, a focal length of the second lens element 120, the third lens element 130, the fourth lens element 140 and the fifth lens element 150 combined is f2345, and they satisfy the relation: f1/f2345=−1.121.

In the first embodiment of the present five-piece optical lens system, an Abbe number of the second lens element 120 is V2, an Abbe number of the third lens element 130 is V3, and they satisfy the relation: V3−V2=34.60.

In the first embodiment of the present five-piece optical lens system, an Abbe number of the fourth lens element 140 is V4, an Abbe number of the fifth lens element 150 is V5, and they satisfy the relation: V4−V5=34.60.

In the first embodiment of the present five-piece optical lens system, the focal length of the five-piece optical lens system is f, a distance from the object-side surface 111 of the first lens element 110 to the image plane 180 along the optical axis 190 is TL, and they satisfy the relation: f/TL=1.120.

The detailed optical data of the first embodiment is shown in table 1, and the aspheric surface data is shown in table 2.

TABLE 1

Embodiment 1
f (focal length) = 6.180 mm, Fno = 2.4, FOV = 47.4 deg.

| surface | | Curvature Radius | | Thickness | Material | Index | Abbe # | Focal length |
|---|---|---|---|---|---|---|---|---|
| 0 | object | infinity | | infinity | | | | |
| 1 | | infinity | | 0.561 | | | | |
| 2 | stop | infinity | | −0.561 | | | | |
| 3 | Lens 1 | 1.484 | (ASP) | 0.939 | plastic | 1.544 | 56.0 | 2.63 |
| 4 | | −36.699 | (ASP) | 0.050 | | | | |
| 5 | Lens 2 | 6.689 | (ASP) | 0.250 | plastic | 1.650 | 21.4 | −4.34 |
| 6 | | 1.972 | (ASP) | 0.385 | | | | |
| 7 | Lens 3 | 16.817 | (ASP) | 0.250 | plastic | 1.544 | 56.0 | −15.63 |
| 8 | | 5.634 | (ASP) | 1.441 | | | | |
| 9 | Lens 4 | −6.643 | (ASP) | 0.300 | plastic | 1.544 | 56.0 | −5.02 |
| 10 | | 4.743 | (ASP) | 0.043 | | | | |
| 11 | Lens 5 | 9.583 | (ASP) | 0.574 | plastic | 1.650 | 21.4 | 9.10 |
| 12 | | −15.534 | (ASP) | 0.969 | | | | |
| 13 | IR-filter | infinity | | 0.210 | glass | 1.517 | 64.2 | |
| 14 | | infinity | | 0.110 | | | | |
| 15 | Image plane | infinity | | infinity | | | | |

TABLE 2

Aspheric Coefficients

| surface | 3 | 4 | 5 | 6 | 7 |
|---|---|---|---|---|---|
| K: | −2.7258E−01 | −1.2181E+02 | 3.2653E+01 | 4.1323E−01 | 5.8732E+01 |
| A: | 9.6900E−03 | 2.5479E−02 | −3.4632E−02 | −1.7749E−02 | 6.2262E−02 |
| B: | −1.9630E−03 | 2.6095E−02 | 1.1854E−01 | 2.0564E−01 | 1.0002E−01 |
| C: | 1.1662E−02 | −4.8901E−02 | −1.1997E−01 | −1.1342E−01 | 5.0712E−02 |
| D: | −1.0429E−02 | 4.3057E−02 | 1.0446E−01 | 3.0625E−01 | 1.6840E−02 |
| E: | 3.9140E−03 | −1.4179E−02 | −5.0818E−02 | −1.0679E−01 | −1.7920E−02 |

| surface | 8 | 9 | 10 | 11 | 12 |
|---|---|---|---|---|---|
| K: | −1.9267E+02 | 5.5088E+00 | −2.6042E+01 | 1.3440E+01 | −2.0000E+02 |
| A: | 2.2381E−01 | −1.3701E−01 | −1.0567E−01 | −5.7050E−02 | −6.1690E−02 |
| B: | −1.9331E−01 | 1.6850E−03 | 5.8640E−03 | 3.6755E−02 | 3.9578E−02 |
| C: | 4.9217E−01 | 1.4601E−02 | 7.1010E−03 | −1.2057E−02 | −1.1358E−02 |
| D: | −5.0784E−01 | −8.8490E−03 | −3.1030E−03 | 1.8290E−03 | 1.4870E−03 |
| E: | 2.6197E−01 | 2.9910E−03 | 3.0500E−04 | −1.2100E−04 | −8.2000E−05 |

The units of the radius of curvature, the thickness and the focal length in table 1 are expressed in mm, the surface numbers 0-15 represent the surfaces sequentially arranged from the object-side to the image-side along the optical axis. In table 2, k represents the conic coefficient of the equation of the aspheric surface profiles, and A, B, C, D, E, F, G . . . : represent the high-order aspheric coefficients. The tables presented below for each embodiment are the corresponding schematic parameter, image plane curves and distortion curves, and the definitions of the tables are the same as Table 1 and Table 2 of the first embodiment. Therefore, an explanation in this regard will not be provided again.

Figure 2A:
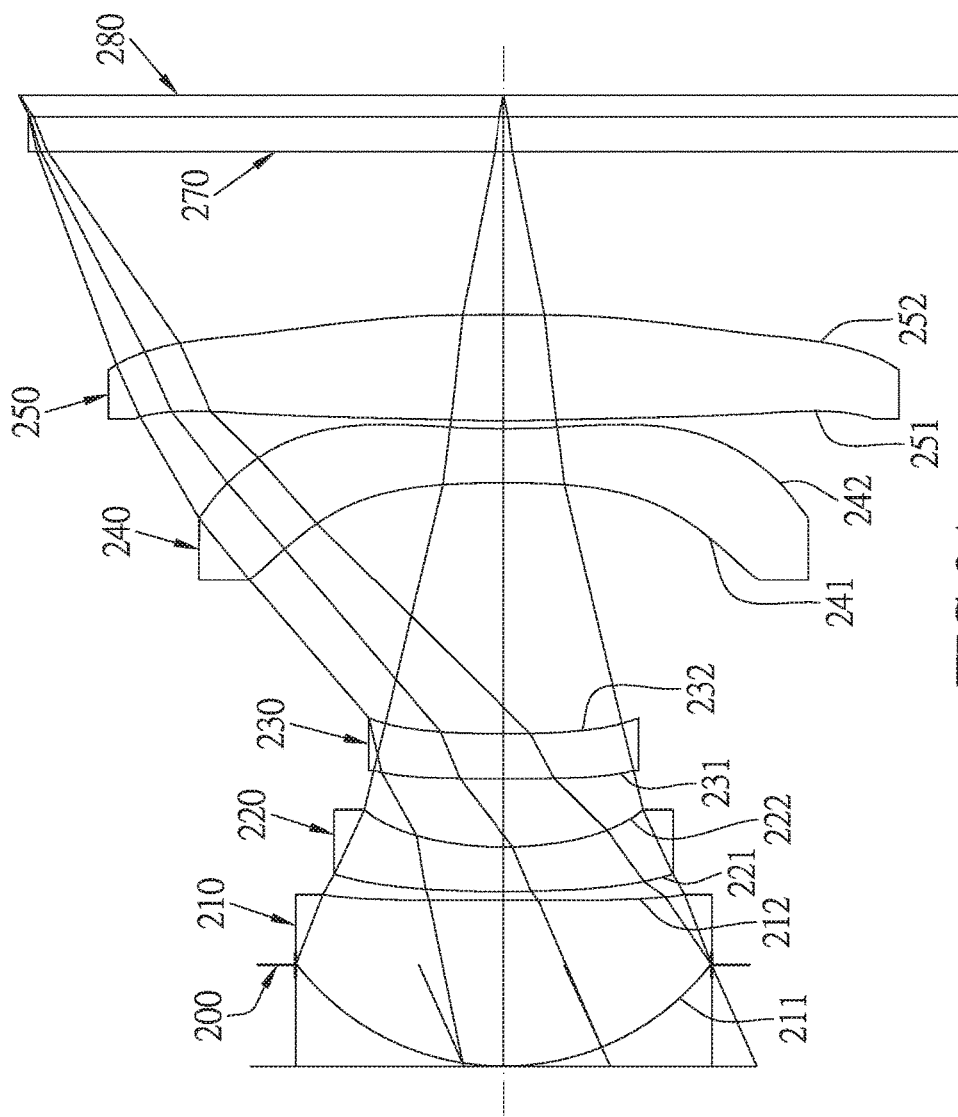
FIG. 2A shows a five-piece optical lens system in accordance with a second embodiment of the present invention.

Referring to FIGS. 2A and 2B, FIG. 2A shows a five-piece optical lens system in accordance with a second embodiment of the present invention, and FIG. 2B shows, in order from left to right, the image plane curve and the distortion curve of the second embodiment of the present invention. A five-piece optical lens system in accordance with the second embodiment of the present invention comprises a stop 200 and a lens group. The lens group comprises, in order from an object side to an image side: a first lens element 210, a second lens element 220, a third lens element 230, a fourth lens element 240, a fifth lens element 250, an IR cut filter 270, and an image plane 280, wherein the five-piece optical lens system has a total of five lens elements with refractive power. The stop 200 is disposed between an object-side surface 211 and an image-side surface 212 of the first lens element 210.

The first lens element 210 with a positive refractive power has the object-side surface 211 being convex near an optical axis 290 and the image-side surface 212 being convex near the optical axis 290, the object-side surface 211 and the image-side surface 212 are aspheric, and the first lens element 210 is made of plastic material.

The second lens element 220 with a negative refractive power has an object-side surface 221 being convex near the optical axis 290 and an image-side surface 222 being concave near the optical axis 290, the object-side surface 221 and the image-side surface 222 are aspheric, and the second lens element 220 is made of plastic material.

The third lens element 230 with a negative refractive power has an object-side surface 231 being convex near the optical axis 290 and an image-side surface 232 being concave near the optical axis 290, the object-side surface 231 and the image-side surface 232 are aspheric, and the third lens element 230 is made of plastic material.

The fourth lens element 240 with a negative refractive power has an object-side surface 241 being concave near the optical axis 290 and an image-side surface 242 being concave near the optical axis 290, the object-side surface 241 and the image-side surface 242 are aspheric, and the fourth lens element 240 is made of plastic material.

The fifth lens element 250 with a positive refractive power has an object-side surface 251 being convex near the optical axis 290 and an image-side surface 252 being convex near the optical axis 290, the object-side surface 251 and the image-side surface 252 are aspheric, the fifth lens element 250 is made of plastic material, and at least one of the object-side surface 251 and the image-side surface 252 is provided with at least one inflection point.

The IR cut filter 270 made of glass is located between the fifth lens element 250 and the image plane 280 and has no influence on the focal length of the five-piece optical lens system.

The detailed optical data of the second embodiment is shown in table 3, and the aspheric surface data is shown in table 4.

In the second embodiment, the equation of the aspheric surface profiles of the aforementioned lens elements is the same as the equation of the first embodiment. Also, the definitions of these parameters shown in the following table are the same as those stated in the first embodiment with corresponding values for the second embodiment, so an explanation in this regard will not be provided again.

Moreover, these parameters can be calculated from Table 3 and Table 4 as the following values and satisfy the following conditions:

| Embodiment 2 | |
|---|---|
| f[mm] | 6.540 |
| Fno | 2.6 |
| FOV[deg.] | 48 |
| f1/f2 | −0.620 |
| f2/f3 | 0.211 |
| f3/f4 | 3.980 |
| f4/f5 | −0.525 |
| f1/f3 | −0.131 |

TABLE 3

Embodiment 2
f (focal length) = 6.540 mm, Fno = 2.6, FOV = 48 deg.

| surface | | Curvature Radius | | Thickness | Material | Index | Abbe # | Focal length |
|---|---|---|---|---|---|---|---|---|
| 0 | object | infinity | | infinity | | | | |
| 1 | | infinity | | 0.611 | | | | |
| 2 | stop | infinity | | −0.611 | | | | |
| 3 | Lens 1 | 1.567 | (ASP) | 1.001 | plastic | 1.544 | 56.0 | 2.85 |
| 4 | | −229.413 | (ASP) | 0.055 | | | | |
| 5 | Lens 2 | 7.291 | (ASP) | 0.273 | plastic | 1.650 | 21.4 | −4.60 |
| 6 | | 2.106 | (ASP) | 0.412 | | | | |
| 7 | Lens 3 | 17.396 | (ASP) | 0.273 | plastic | 1.544 | 56.0 | −21.79 |
| 8 | | 7.030 | (ASP) | 1.520 | | | | |
| 9 | Lens 4 | −7.614 | (ASP) | 0.327 | plastic | 1.544 | 56.0 | −5.48 |
| 10 | | 5.003 | (ASP) | 0.049 | | | | |
| 11 | Lens 5 | 10.837 | (ASP) | 0.640 | plastic | 1.650 | 21.4 | 10.43 |
| 12 | | −18.250 | (ASP) | 0.988 | | | | |
| 13 | IR-filter | infinity | | 0.210 | glass | 1.517 | 64.2 | |
| 14 | | infinity | | 0.130 | | | | |
| 15 | Image plane | infinity | | infinity | | | | |

TABLE 4

Aspheric Coefficients

| surface | 3 | 4 | 5 | 6 | 7 |
|---|---|---|---|---|---|
| K: | −2.4773E−01 | −1.2181E+02 | 3.1644E+01 | 4.7509E−01 | 5.8732E+01 |
| A: | 7.7600E−03 | 1.8827E−02 | −3.0864E−02 | −1.9836E−02 | 3.1381E−02 |
| B: | −1.3920E−03 | 3.5652E−02 | 1.0720E−01 | 1.5060E−01 | 7.9920E−02 |
| C: | 8.4330E−03 | −6.5454E−02 | −1.3589E−01 | −9.2884E−02 | −1.2464E−02 |
| D: | −6.5180E−03 | 5.2708E−02 | 1.1564E−01 | 1.4844E−01 | 5.2166E−02 |
| E: | 2.1810E−03 | −1.5311E−02 | −4.2084E−02 | −6.6510E−03 | −2.0777E−02 |

| surface | 8 | 9 | 10 | 11 | 12 |
|---|---|---|---|---|---|
| K: | −1.9267E+02 | 5.5088E+00 | −1.6540E+01 | 1.3440E+01 | −2.0000E+02 |
| A: | 1.3525E−01 | −1.0722E−01 | −8.5724E−02 | −4.6930E−02 | −5.3278E−02 |
| B: | −4.8212E−02 | 7.5210E−03 | 2.1880E−03 | 2.7003E−02 | 3.0552E−02 |
| C: | 1.4924E−01 | −4.6470E−03 | 4.2170E−03 | −7.3300E−03 | −7.2850E−03 |
| D: | −1.3116E−01 | 3.7870E−03 | −1.3260E−03 | 9.0800E−04 | 7.7800E−04 |
| E: | 6.2980E−02 | −3.0900E−04 | 1.0000E−04 | −4.7000E−05 | −3.3000E−05 |

-continued

| Embodiment 2 | |
|---|---|
| f2/f4 | 0.840 |
| f3/f5 | −2.089 |
| f1/f23 | −0.769 |
| f23/f45 | 0.304 |
| f12/f34 | −1.181 |
| f34/f5 | −0.397 |
| f1/f234 | −1.577 |
| f234/f5 | −0.173 |
| f123/f4 | −1.017 |
| f123/f45 | −0.456 |
| f1/f2345 | −1.111 |
| V3-V2 | 34.600 |
| V4-V5 | 34.600 |
| f/TL | 1.113 |

Figure 3A:
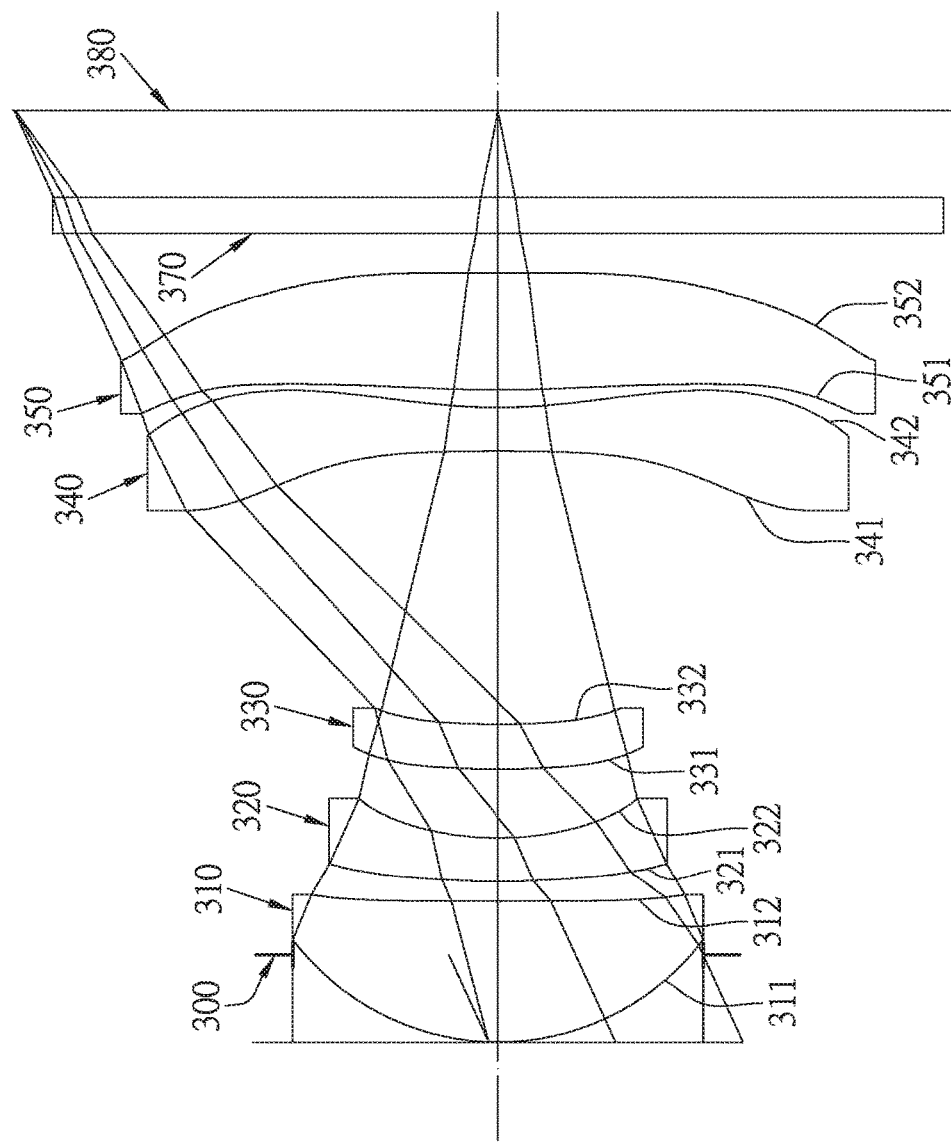
FIG. 3A shows a five-piece optical lens system in accordance with a third embodiment of the present invention.
Figure 3B:
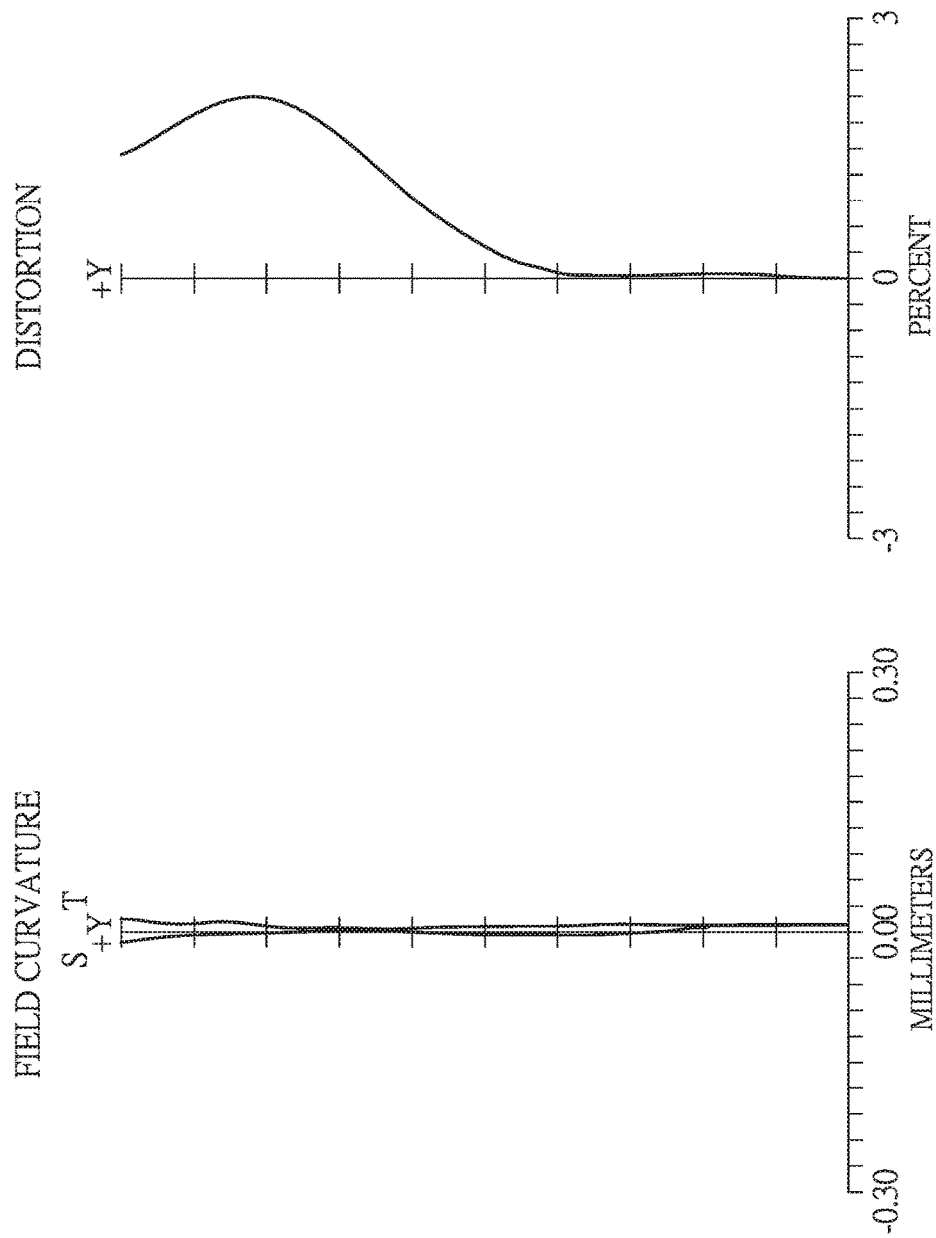
FIG. 3B shows the image plane curve and the distortion curve of the third embodiment of the present invention.

Referring to FIGS. 3A and 3B, FIG. 3A shows a five-piece optical lens system in accordance with a third embodiment of the present invention, and FIG. 3B shows, in order from left to right, the image plane curve and the distortion curve of the third embodiment of the present invention. A five-piece optical lens system in accordance with the third embodiment of the present invention comprises a stop 300 and a lens group. The lens group comprises, in order from an object side to an image side: a first lens element 310, a second lens element 320, a third lens element 330, a fourth lens element 340, a fifth lens element 350, an IR cut filter 370, and an image plane 380, wherein the five-piece optical lens system has a total of five lens elements with refractive power. The stop 300 is disposed between an object-side surface 311 and an image-side surface 312 of the first lens element 310.

The first lens element 310 with a positive refractive power has the object-side surface 311 being convex near an optical axis 390 and the image-side surface 312 being concave near the optical axis 390, the object-side surface 311 and the image-side surface 312 are aspheric, and the first lens element 310 is made of plastic material.

The second lens element 320 with a negative refractive power has an object-side surface 321 being convex near the optical axis 390 and an image-side surface 322 being concave near the optical axis 390, the object-side surface 321 and the image-side surface 322 are aspheric, and the second lens element 320 is made of plastic material.

The third lens element 330 with a negative refractive power has an object-side surface 331 being convex near the optical axis 390 and an image-side surface 332 being concave near the optical axis 390, the object-side surface 331 and the image-side surface 332 are aspheric, and the third lens element 330 is made of plastic material.

The fourth lens element 340 with a negative refractive power has an object-side surface 341 being concave near the optical axis 390 and an image-side surface 342 being concave near the optical axis 390, the object-side surface 341 and the image-side surface 342 are aspheric, and the fourth lens element 340 is made of plastic material.

The fifth lens element 350 with a positive refractive power has an object-side surface 351 being convex near the optical axis 390 and an image-side surface 352 being concave near the optical axis 390, the object-side surface 351 and the image-side surface 352 are aspheric, the fifth lens element 350 is made of plastic material, and at least one of the object-side surface 351 and the image-side surface 252 is provided with at least one inflection point.

The IR cut filter 370 made of glass is located between the fifth lens element 350 and the image plane 380 and has no influence on the focal length of the five-piece optical lens system.

The detailed optical data of the third embodiment is shown in table 5, and the aspheric surface data is shown in table 6.

TABLE 5

Embodiment 3
f (focal length) = 5.970 mm, Fno = 2.6, FOV = 49 deg.

| surface | | Curvature Radius | | Thickness | Material | Index | Abbe # | Focal length |
|---|---|---|---|---|---|---|---|---|
| 0 | object | infinity | | infinity | | | | |
| 1 | | infinity | | 0.500 | | | | |
| 2 | stop | infinity | | −0.500 | | | | |
| 3 | Lens 1 | 1.477 | (ASP) | 0.808 | plastic | 1.544 | 56.0 | 2.74 |
| 4 | | 89.481 | (ASP) | 0.115 | | | | |
| 5 | Lens 2 | 4.377 | (ASP) | 0.250 | plastic | 1.651 | 21.5 | −4.22 |
| 6 | | 1.657 | (ASP) | 0.396 | | | | |
| 7 | Lens 3 | 6.254 | (ASP) | 0.256 | plastic | 1.544 | 56.0 | −52.01 |
| 8 | | 5.051 | (ASP) | 1.569 | | | | |
| 9 | Lens 4 | −14.630 | (ASP) | 0.250 | plastic | 1.544 | 56.0 | −5.17 |
| 10 | | 3.513 | (ASP) | 0.100 | | | | |
| 11 | Lens 5 | 6.937 | (ASP) | 0.672 | plastic | 1.651 | 21.5 | 14.96 |
| 12 | | −22.727 | (ASP) | 0.224 | | | | |
| 13 | IR-filter | infinity | | 0.210 | glass | 1.517 | 64.2 | |
| 14 | | infinity | | 0.500 | | | | |
| 15 | Image plane | infinity | | infinity | | | | |

TABLE 6

Aspheric Coefficients

| surface | 3 | 4 | 5 | 6 | 7 |
|---|---|---|---|---|---|
| K: | 2.9475E−02 | 4.1916E+01 | 2.4307E+00 | 1.8319E+00 | 2.8587E+01 |
| A: | 1.3660E−03 | −7.7880E−03 | −1.5334E−01 | −1.9948E−01 | 4.7284E−02 |

TABLE 6-continued

| Aspheric Coefficients | | | | |
|---|---|---|---|---|
| B: | −5.0460E−03 | 8.1971E−02 | 3.1971E−01 | 3.5833E−01 | 1.2885E−01 |
| C: | 8.7280E−03 | −9.8522E−02 | −2.9521E−01 | −2.7244E−01 | 3.4842E−02 |
| D: | −9.1530E−03 | 6.5827E−02 | 1.7219E−01 | 2.3811E−01 | −8.4043E−02 |
| E: | 3.5320E−03 | −1.8093E−02 | −5.2703E−02 | −1.1140E−01 | 3.3460E−02 |

| surface | 8 | 9 | 10 | 11 | 12 |
|---|---|---|---|---|---|
| K: | 5.4576E+00 | 1.5460E+01 | −9.5468E+00 | −1.7856E+02 | 1.0581E+02 |
| A: | 1.1927E−01 | −3.1969E−02 | 1.2095E−02 | −4.1540E−03 | −9.7071E−02 |
| B: | 9.4441E−02 | −9.4155E−02 | −1.0433E−01 | −3.1511E−02 | 3.7355E−02 |
| C: | 4.3197E−02 | 9.5110E−02 | 9.3156E−02 | 3.6520E−02 | −9.7740E−03 |
| D: | −9.3626E−02 | −4.2540E−02 | −4.2887E−02 | −1.8154E−02 | 2.9100E−03 |
| E: | 5.7974E−02 | 1.1256E−02 | 1.0781E−02 | 4.3950E−03 | −8.9700E−04 |
| F | | −1.6820E−03 | −1.4000E−03 | −5.1700E−04 | 1.4300E−04 |
| G | | 1.0753E−04 | 7.3062E−05 | 2.3718E−05 | −8.0463E−06 |

In the third embodiment, the equation of the aspheric surface profiles of the aforementioned lens elements is the same as the equation of the first embodiment. Also, the definitions of these parameters shown in the following table are the same as those stated in the first embodiment with corresponding values for the third embodiment, so an explanation in this regard will not be provided again.

Moreover, these parameters can be calculated from Table 5 and Table 6 as the following values and satisfy the following conditions:

| Embodiment 3 | |
|---|---|
| f[mm] | 5.970 |
| Fno | 2.6 |
| FOV[deg.] | 49 |
| f1/f2 | −0.651 |
| f2/f3 | 0.081 |
| f3/f4 | 10.068 |
| f4/f5 | −0.345 |
| f1/f3 | −0.053 |
| f2/f4 | 0.816 |
| f3/f5 | −3.478 |
| f1/f23 | −0.719 |
| f23/f45 | 0.486 |
| f12/f34 | −1.056 |
| f34/f5 | −0.309 |
| f1/f234 | −1.537 |
| f234/f5 | −0.119 |
| f123/f4 | −0.984 |
| f123/f45 | −0.647 |
| f1/f2345 | −1.259 |
| V3-V2 | 34.600 |
| V4-V5 | 34.600 |
| f/TL | 1.116 |

Figure 4A:
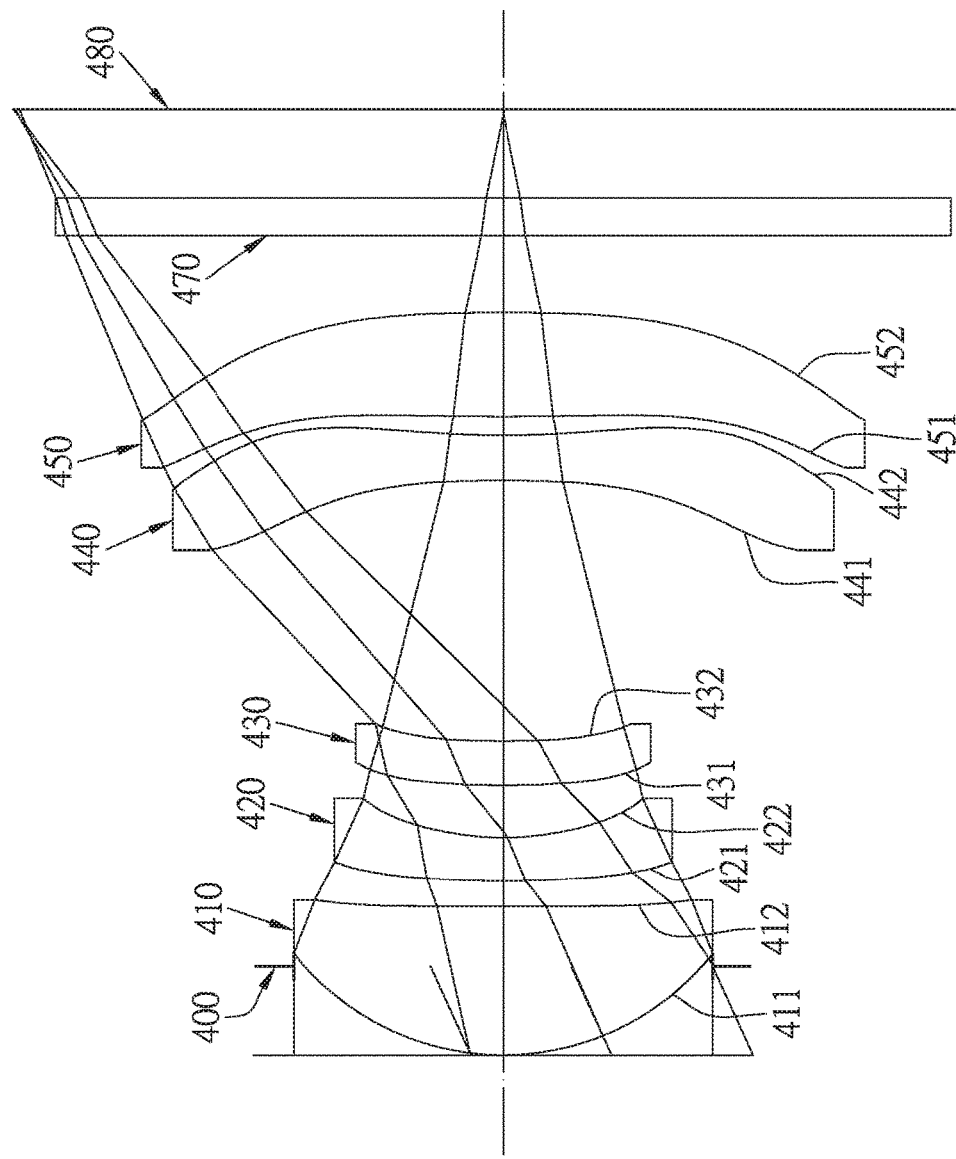
FIG. 4A shows a five-piece optical lens system in accordance with a fourth embodiment of the present invention.

Referring to FIGS. 4A and 4B, FIG. 4A shows a five-piece optical lens system in accordance with a fourth embodiment of the present invention, and FIG. 4B shows, in order from left to right, the image plane curve and the distortion curve of the fourth embodiment of the present invention. A five-piece optical lens system in accordance with the fourth embodiment of the present invention comprises a stop 400 and a lens group. The lens group comprises, in order from an object side to an image side: a first lens element 410, a second lens element 420, a third lens element 430, a fourth lens element 440, a fifth lens element 450, an IR cut filter 470, and an image plane 480, wherein the five-piece optical lens system has a total of five lens elements with refractive power. The stop 400 is disposed between an object-side surface 411 and an image-side surface 412 of the first lens element 410.

The first lens element 410 with a positive refractive power has the object-side surface 411 being convex near an optical axis 490 and the image-side surface 412 being concave near the optical axis 490, the object-side surface 411 and the image-side surface 412 are aspheric, and the first lens element 410 is made of plastic material.

The second lens element 420 with a negative refractive power has an object-side surface 421 being convex near the optical axis 490 and an image-side surface 422 being concave near the optical axis 490, the object-side surface 421 and the image-side surface 422 are aspheric, and the second lens element 420 is made of plastic material.

The third lens element 430 with a negative refractive power has an object-side surface 431 being convex near the optical axis 490 and an image-side surface 432 being concave near the optical axis 490, the object-side surface 431 and the image-side surface 432 are aspheric, and the third lens element 430 is made of plastic material.

The fourth lens element 440 with a negative refractive power has an object-side surface 441 being concave near the optical axis 490 and an image-side surface 442 being concave near the optical axis 490, the object-side surface 441 and the image-side surface 442 are aspheric, and the fourth lens element 440 is made of plastic material.

The fifth lens element 450 with a positive refractive power has an object-side surface 451 being convex near the optical axis 490 and an image-side surface 452 being convex near the optical axis 490, the object-side surface 451 and the image-side surface 452 are aspheric, the fifth lens element 450 is made of plastic material, and at least one of the object-side surface 451 and the image-side surface 452 is provided with at least one inflection point.

The IR cut filter 470 made of glass is located between the fifth lens element 450 and the image plane 480 and has no influence on the focal length of the five-piece optical lens system.

The detailed optical data of the fourth embodiment is shown in table 7, and the aspheric surface data is shown in table 8.

TABLE 7

Embodiment 4
f (focal length) = 5.970 mm, Fno = 2.4, FOV = 49 deg.

| surface | | Curvature Radius | | Thickness | Material | Index | Abbe # | Focal length |
|---|---|---|---|---|---|---|---|---|
| 0 | object | infinity | | infinity | | | | |
| 1 | | infinity | | 0.500 | | | | |
| 2 | stop | infinity | | −0.500 | | | | |
| 3 | Lens 1 | 1.477 | (ASP) | 0.837 | plastic | 1.544 | 56.0 | 2.72 |
| 4 | | 172.777 | (ASP) | 0.143 | | | | |
| 5 | Lens 2 | 4.545 | (ASP) | 0.248 | plastic | 1.661 | 20.4 | −3.88 |
| 6 | | 1.614 | (ASP) | 0.294 | | | | |
| 7 | Lens 3 | 5.545 | (ASP) | 0.247 | plastic | 1.544 | 56.0 | −217.67 |
| 8 | | 5.214 | (ASP) | 1.472 | | | | |
| 9 | Lens 4 | −7.791 | (ASP) | 0.253 | plastic | 1.544 | 56.0 | −5.41 |
| 10 | | 4.813 | (ASP) | 0.106 | | | | |
| 11 | Lens 5 | 13.365 | (ASP) | 0.585 | plastic | 1.661 | 20.4 | 11.33 |
| 12 | | −17.110 | (ASP) | 0.438 | | | | |
| 13 | IR-filter | infinity | | 0.210 | glass | 1.517 | 64.2 | |
| 14 | | infinity | | 0.500 | | | | |
| 15 | Image plane | infinity | | infinity | | | | |

TABLE 8

Aspheric Coefficients

| surface | 3 | 4 | 5 | 6 | 7 |
|---|---|---|---|---|---|
| K: | −5.7530E−03 | −1.4962E+02 | 4.8205E+00 | 1.5579E+00 | 2.3100E+01 |
| A: | −1.7880E−03 | −8.1690E−03 | −1.7094E−01 | −2.5417E−01 | 1.5879E−02 |
| B: | −6.2500E−03 | 8.0859E−02 | 3.8572E−01 | 4.5904E−01 | 1.1718E−01 |
| C: | 7.7240E−03 | −8.9687E−02 | −3.5619E−01 | −3.5195E−01 | 7.9936E−02 |
| D: | −7.9500E−03 | 5.9735E−02 | 2.1956E−01 | 3.3991E−01 | −5.3080E−02 |
| E: | 2.5740E−03 | −1.6614E−02 | −6.9147E−02 | −1.2373E−01 | −4.0770E−03 |

| surface | 8 | 9 | 10 | 11 | 12 |
|---|---|---|---|---|---|
| K: | 1.2588E+01 | 1.5686E+01 | −1.8927E+01 | −1.7634E+02 | −1.9061E+02 |
| A: | 1.0833E−01 | −6.3739E−02 | −3.1251E−02 | −3.2403E−02 | −6.2172E−02 |
| B: | 1.0373E−01 | −2.6400E−02 | −4.2372E−02 | −1.5351E−02 | 1.4130E−03 |
| C: | 4.8232E−02 | 4.6439E−02 | 4.6470E−02 | 3.1279E−02 | 1.7958E−02 |
| D: | −1.3046E−01 | −2.6487E−02 | −2.8116E−02 | −2.6683E−02 | −1.3940E−02 |
| E: | 8.6110E−02 | 8.8230E−03 | 9.0950E−03 | 1.1141E−02 | 4.9870E−03 |
| F | | −1.3080E−03 | −1.4160E−03 | −2.2290E−03 | −8.7800E−04 |
| G | | 3.7905E−05 | 8.1002E−05 | 1.7269E−04 | 6.1637E−05 |

In the fourth embodiment, the equation of the aspheric surface profiles of the aforementioned lens elements is the same as the equation of the first embodiment. Also, the definitions of these parameters shown in the following table are the same as those stated in the first embodiment with corresponding values for the fourth embodiment, so an explanation in this regard will not be provided again.

Moreover, these parameters can be calculated from Table 7 and Table 8 as the following values and satisfy the following conditions:

| Embodiment 4 | |
|---|---|
| f[mm] | 5.970 |
| Fno | 2.4 |
| FOV[deg.] | 49 |
| f1/f2 | −0.702 |
| f2/f3 | 0.018 |
| f3/f4 | 40.214 |
| f4/f5 | −0.478 |
| f1/f3 | −0.013 |
| f2/f4 | 0.717 |

-continued

| Embodiment 4 | |
|---|---|
| f3/f5 | −19.205 |
| f1/f23 | −0.727 |
| f23/f45 | 0.342 |
| f12/f34 | −0.953 |
| f34/f5 | −0.470 |
| f1/f234 | −1.481 |
| f234/f5 | −0.162 |
| f123/f4 | −0.935 |
| f123/f45 | −0.462 |
| f1/f2345 | −1.078 |
| V3−V2 | 35.600 |
| V4−V5 | 35.600 |
| f/TL | 1.120 |

Figure 5A:
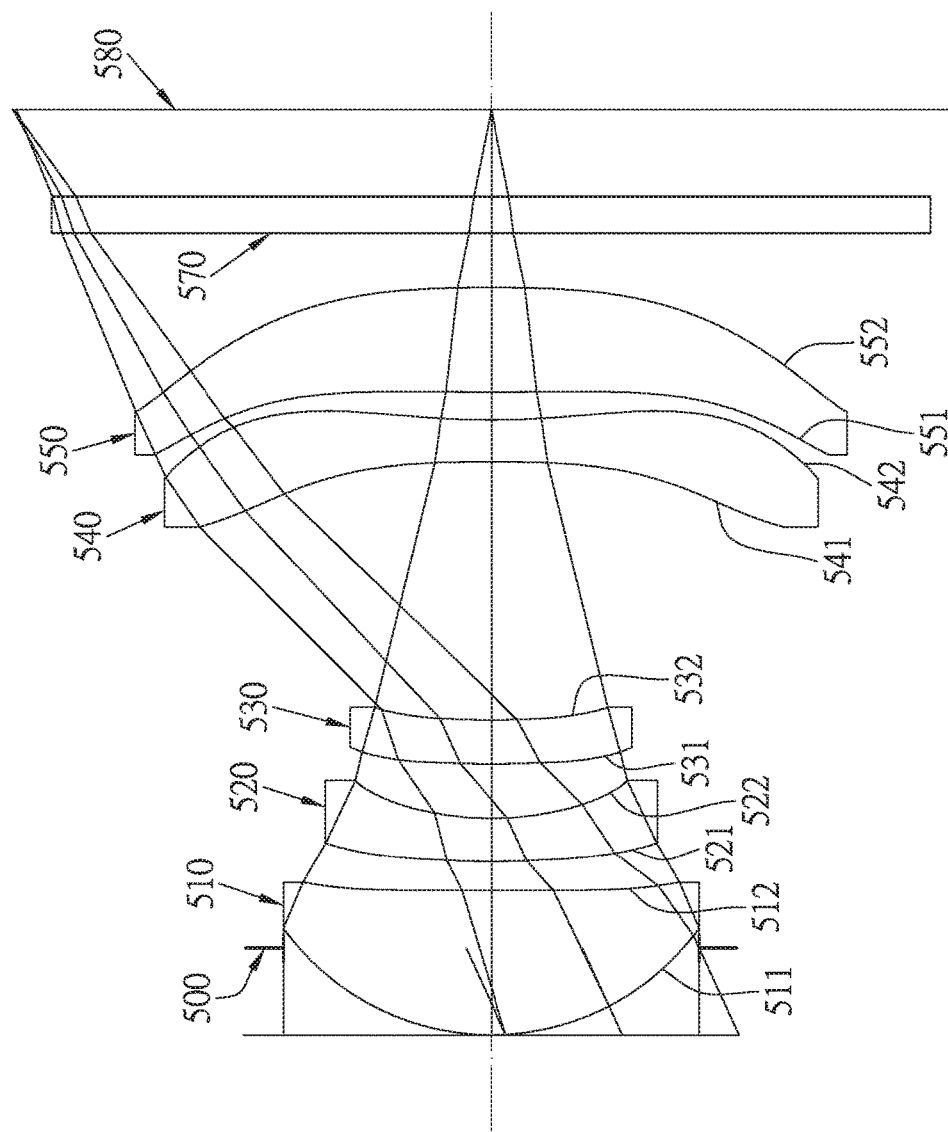
FIG. 5A shows a five-piece optical lens system in accordance with a fifth embodiment of the present invention.
Figure 5B:
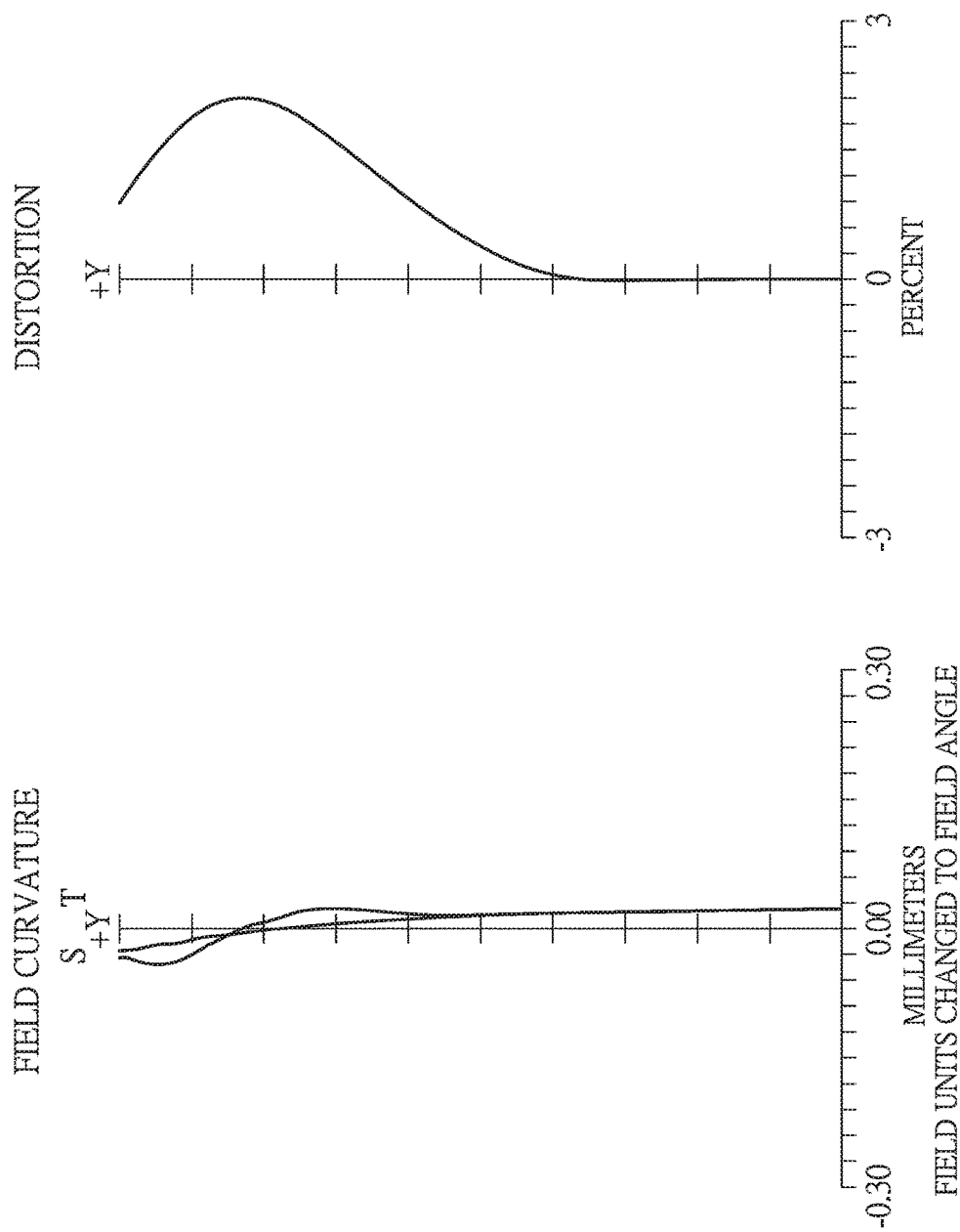
FIG. 5B shows the image plane curve and the distortion curve of the fifth embodiment of the present invention.

Referring to FIGS. 5A and 5B, FIG. 5A shows a five-piece optical lens system in accordance with a fifth embodiment of the present invention, and FIG. 5B shows, in order from left to right, the image plane curve and the distortion curve of the fifth embodiment of the present invention. A five-piece optical lens system in accordance with the fifth embodiment of the present invention comprises a stop 500 and a lens group. The lens group comprises, in order from an object side to an image side: a first lens element 510, a second lens element 520, a third lens element 530, a fourth lens element 540, a fifth lens element 550, an IR cut filter 570, and an image plane 580, wherein the five-piece optical lens system has a total of five lens elements with refractive power. The stop 500 is disposed between an object-side surface 511 and an image-side surface 512 of the first lens element 510.

The first lens element 510 with a positive refractive power has the object-side surface 511 being convex near an optical axis 590 and the image-side surface 512 being concave near the optical axis 590, the object-side surface 511 and the image-side surface 512 are aspheric, and the first lens element 510 is made of plastic material.

The second lens element 520 with a negative refractive power has an object-side surface 521 being convex near the optical axis 590 and an image-side surface 522 being concave near the optical axis 590, the object-side surface 521 and the image-side surface 522 are aspheric, and the second lens element 520 is made of plastic material.

The third lens element 530 with a negative refractive power has an object-side surface 531 being convex near the optical axis 590 and an image-side surface 532 being concave near the optical axis 590, the object-side surface 531 and the image-side surface 532 are aspheric, and the third lens element 530 is made of plastic material.

The fourth lens element 540 with a negative refractive power has an object-side surface 541 being concave near the optical axis 590 and an image-side surface 542 being concave near the optical axis 590, the object-side surface 541 and the image-side surface 542 are aspheric, and the fourth lens element 540 is made of plastic material.

The fifth lens element 550 with a positive refractive power has an object-side surface 551 being convex near the optical axis 590 and an image-side surface 552 being concave near the optical axis 590, the object-side surface 551 and the image-side surface 552 are aspheric, the fifth lens element 550 is made of plastic material, and at least one of the object-side surface 551 and the image-side surface 552 is provided with at least one inflection point.

The IR cut filter 570 made of glass is located between the fifth lens element 550 and the image plane 580 and has no influence on the focal length of the five-piece optical lens system.

The detailed optical data of the fifth embodiment is shown in table 9, and the aspheric surface data is shown in table 10.

TABLE 9

Embodiment 5
f (focal length) = 5.980 mm, Fno = 2.4, FOV = 49.2 deg.

| surface | | Curvature Radius | | Thickness | Material | Index | Abbe # | Focal length |
|---|---|---|---|---|---|---|---|---|
| 0 | object | infinity | | infinity | | | | |
| 1 | | infinity | | 0.500 | | | | |
| 2 | stop | infinity | | −0.500 | | | | |
| 3 | Lens 1 | 1.461 | (ASP) | 0.830 | plastic | 1.544 | 56.0 | 2.72 |
| 4 | | 84.339 | (ASP) | 0.168 | | | | |
| 5 | Lens 2 | 4.420 | (ASP) | 0.249 | plastic | 1.661 | 20.4 | −3.93 |
| 6 | | 1.608 | (ASP) | 0.314 | | | | |
| 7 | Lens 3 | 7.396 | (ASP) | 0.252 | plastic | 1.544 | 56.0 | −52.27 |
| 8 | | 5.802 | (ASP) | 1.488 | | | | |
| 9 | Lens 4 | −9.675 | (ASP) | 0.241 | plastic | 1.544 | 56.0 | −5.75 |
| 10 | | 4.681 | (ASP) | 0.160 | | | | |
| 11 | Lens 5 | 26.634 | (ASP) | 0.600 | plastic | 1.661 | 20.4 | 11.25 |
| 12 | | −10.352 | (ASP) | 0.316 | | | | |
| 13 | IR-filter | infinity | | 0.210 | glass | 1.517 | 64.2 | |
| 14 | | infinity | | 0.500 | | | | |
| 15 | Image plane | infinity | | infinity | | | | |

TABLE 10

Aspheric Coefficients

| surface | 3 | 4 | 5 | 6 | 7 |
|---|---|---|---|---|---|
| K: | 1.8580E−03 | 5.0008E+02 | 4.2526E+00 | 1.4899E+00 | 1.8213E+01 |
| A: | −1.3310E−03 | −6.1010E−03 | −1.7171E−01 | −2.5573E−01 | 1.4364E−02 |
| B: | −5.7690E−03 | 8.0491E−02 | 3.8483E−01 | 4.6402E−01 | 1.2826E−01 |
| C: | 8.1970E−03 | −8.9645E−02 | −3.5714E−01 | −3.5028E−01 | 8.1915E−02 |
| D: | −7.6230E−03 | 6.0099E−02 | 2.1918E−01 | 3.3500E−01 | −7.5391E−02 |
| E: | 2.8050E−03 | −1.7149E−02 | −7.3542E−02 | −1.0121E−01 | 2.6810E−03 |

| surface | 8 | 9 | 10 | 11 | 12 |
|---|---|---|---|---|---|
| K: | 1.4638E+01 | 1.1292E+01 | −1.9333E+00 | 4.8034E+01 | −3.8795E+00 |
| A: | 1.1306E−01 | −6.4796E−02 | −4.2477E−02 | −3.5267E−02 | −6.3822E−02 |
| B: | 9.6590E−02 | −2.3054E−02 | −3.9546E−02 | −1.4751E−02 | 1.2480E−03 |
| C: | 4.3155E−02 | 4.5840E−02 | 4.6449E−02 | 3.0997E−02 | 1.8122E−02 |

TABLE 10-continued

| Aspheric Coefficients | | | | |
|---|---|---|---|---|
| D: | −1.0218E−01 | −2.6924E−02 | −2.8182E−02 | −2.6700E−02 | −1.3917E−02 |
| E: | 2.7090E−02 | 8.6830E−03 | 9.0500E−03 | 1.1150E−02 | 4.9870E−03 |
| F |  | −1.3300E−03 | −1.4250E−03 | −2.2270E−03 | −8.7900E−04 |
| G |  | 6.0546E−05 | 8.4030E−05 | 1.7219E−04 | 6.1644E−05 |

In the fifth embodiment, the equation of the aspheric surface profiles of the aforementioned lens elements is the same as the equation of the first embodiment. Also, the definitions of these parameters shown in the following table are the same as those stated in the first embodiment with corresponding values for the fifth embodiment, so an explanation in this regard will not be provided again.

Moreover, these parameters can be calculated from Table 9 and Table 10 as the following values and satisfy the following conditions:

| Embodiment 5 | |
|---|---|
| f[mm] | 5.983 |
| Fno | 2.4 |
| FOV[deg.] | 49.2 |
| f1/f2 | −0.692 |
| f2/f3 | 0.075 |
| f3/f4 | 9.097 |
| f4/f5 | −0.511 |
| f1/f3 | −0.052 |
| f2/f4 | 0.683 |
| f3/f5 | −4.647 |
| f1/f23 | −0.757 |
| f23/f45 | 0.279 |
| f12/f34 | −0.966 |
| f34/f5 | −0.453 |
| f1/f234 | −1.480 |
| f234/f5 | −0.163 |
| f123/f4 | −0.893 |
| f123/f45 | −0.399 |
| f1/f2345 | −1.049 |
| V3-V2 | 35.600 |
| V4-V5 | 35.600 |
| f/TL | 1.123 |

In the present five-piece optical lens system, the lens elements can be made of plastic or glass. If the lens elements are made of plastic, the cost will be effectively reduced. If the lens elements are made of glass, there is more freedom in distributing the refractive power of the five-piece optical lens system. Plastic lens elements can have aspheric surfaces, which allow more design parameter freedom (than spherical surfaces), so as to reduce the aberration and the number of the lens elements, as well as the total track length of the five-piece optical lens system.

In the present five-piece optical lens system, if the object-side or the image-side surface of the lens elements with refractive power is convex and the location of the convex surface is not defined, the object-side or the image-side surface of the lens elements near the optical axis is convex. If the object-side or the image-side surface of the lens elements is concave and the location of the concave surface is not defined, the object-side or the image-side surface of the lens elements near the optical axis is concave.

The five-piece optical lens system of the present invention can be used in focusing optical systems and can obtain better image quality. The five-piece optical lens system of the present invention can also be used in electronic imaging systems, such as, 3D image capturing, digital camera, mobile device, digital flat panel or vehicle camera.

While we have shown and described various embodiments in accordance with the present invention, it should be clear to those skilled in the art that further embodiments may be made without departing from the scope of the present invention.

What is claimed is:

1. A five-piece optical lens system, in order from an object side to an image side, comprising:
a stop;
a first lens element with a positive refractive power, having an object-side surface being convex near an optical axis, at least one of the object-side surface and an image-side surface of the first lens element being aspheric;
a second lens element with a negative refractive power, having an object-side surface being convex near the optical axis and an image-side surface being concave near the optical axis, at least one of the object-side surface and the image-side surface of the second lens element being aspheric;
a third lens element with a negative refractive power, having an object-side surface being convex near the optical axis and an image-side surface being concave near the optical axis, at least one of the object-side surface and the image-side surface of the third lens element being aspheric;
a fourth lens element with a negative refractive power, having an object-side surface being concave near the optical axis and an image-side surface being concave near the optical axis, at least one of the object-side surface and the image-side surface of the fourth lens element being aspheric; and
a fifth lens element with a positive refractive power, having an image-side surface being convex near the optical axis, at least one of an object-side surface and the image-side surface of the fifth lens element being aspheric and provided with at least one inflection point.

2. The five-piece optical lens system as claimed in claim 1, wherein a focal length of the first lens element is f1, a focal length of the second lens element is f2, and they satisfy the relation: $-0.8 < f1/f2 < -0.5$.

3. The five-piece optical lens system as claimed in claim 1, wherein a focal length of the second lens element is f2, a focal length of the third lens element is f3, and they satisfy the relation: $0.005 < f2/f3 < 0.35$.

4. The five-piece optical lens system as claimed in claim 1, wherein a focal length of the third lens element is f3, a focal length of the fourth lens element is f4, and they satisfy the relation: $2.5 < f3/f4 < 43$.

5. The five-piece optical lens system as claimed in claim 1, wherein a focal length of the fourth lens element is f4, a focal length of the fifth lens element is f5, and they satisfy the relation: $-0.7 < f4/f5 < -0.2$.

6. The five-piece optical lens system as claimed in claim 1, wherein a focal length of the first lens element is f1, a focal length of the third lens element is f3, and they satisfy the relation: $-0.25 < f1/f3 < -0.005$.

7. The five-piece optical lens system as claimed in claim 1, wherein a focal length of the second lens element is f2, a focal length of the fourth lens element is f4, and they satisfy the relation: $0.5<f2/f4<1.0$.

8. The five-piece optical lens system as claimed in claim 1, wherein a focal length of the third lens element is f3, a focal length of the fifth lens element is f5, and they satisfy the relation: $-23<f3/f5<-1.4$.

9. The five-piece optical lens system as claimed in claim 1, wherein a focal length of the first lens element is f1, a focal length of the second lens element and the third lens element combined is f23, and they satisfy the relation: $-0.95<f1/f23<-0.55$.

10. The five-piece optical lens system as claimed in claim 1, wherein a focal length of the second lens element and the third lens element combined is f23, a focal length of the fourth lens element and the fifth lens element combined is f45, and they satisfy the relation: $0.15<f23/f45<0.65$.

11. The five-piece optical lens system as claimed in claim 1, wherein a focal length of the first lens element and the second lens element combined is f12, a focal length of the third lens element and the fourth lens element combined is f34, and they satisfy the relation: $-1.5<f12/f34<-0.7$.

12. The five-piece optical lens system as claimed in claim 1, wherein a focal length of the third lens element and the fourth lens element combined is f34, a focal length of the fifth lens element is f5, and they satisfy the relation: $-0.65<f34/f5<-0.15$.

13. The five-piece optical lens system as claimed in claim 1, wherein a focal length of the first lens element is f1, a focal length of the second lens element, the third lens element and the fourth lens element combined is f234, and they satisfy the relation: $-1.8<f1/f234<-1.3$.

14. The five-piece optical lens system as claimed in claim 1, wherein a focal length of the second lens element, the third lens element and the fourth lens element combined is f234, a focal length of the fifth lens element is f5, and they satisfy the relation: $-0.3<f234/f5<-0.05$.

15. The five-piece optical lens system as claimed in claim 1, wherein a focal length of the first lens element, the second lens element and the third lens element combined is f123, a focal length of the fourth lens element is f4, and they satisfy the relation: $-1.2<f123/f4<-0.75$.

16. The five-piece optical lens system as claimed in claim 1, wherein a focal length of the first lens element, the second lens element and the third lens element combined is f123, a focal length of the fourth lens element and the fifth lens element combined is f45, and they satisfy the relation: $-0.8<f123/f45<-0.25$.

17. The five-piece optical lens system as claimed in claim 1, wherein an Abbe number of the second lens element is V2, an Abbe number of the third lens element is V3, and they satisfy the relation: $30<V3-V2<42$.

18. The five-piece optical lens system as claimed in claim 1, wherein an Abbe number of the fourth lens element is V4, an Abbe number of the fifth lens element is V5, and they satisfy the relation: $30<V4-V5<42$.

19. The five-piece optical lens system as claimed in claim 1, wherein a focal length of the five-piece optical lens system is f, a distance from the object-side surface of the first lens element to an image plane along the optical axis is TL, and they satisfy the relation: $0.95<f/TL<1.3$.

20. The five-piece optical lens system as claimed in claim 1, wherein a focal length of the first lens element is f1, a focal length of the second lens element, the third lens element, the fourth lens element and the fifth lens element combined is f2345, and they satisfy the relation: $-1.5<f1/f2345<-0.75$.

* * * * *